United States Patent
Baldwin et al.

(10) Patent No.: US 10,579,808 B2
(45) Date of Patent: Mar. 3, 2020

(54) SYSTEMS AND METHODS FOR GENERATING PREVIEWS OF CONTENT PROTECTED BY AUTHENTICATION PROTOCOLS

(71) Applicant: Facebook, Inc., Menlo Park, CA (US)

(72) Inventors: Robert Michael Baldwin, San Francisco, CA (US); Luke Dennis Walsh, London (GB); Joel Micha Krebs, London (GB); Connor Treacy, Lisburn (IE)

(73) Assignee: Facebook, Inc., Menlo Park, CA (US)

( * ) Notice: Subject to any disclaimer, the term of this patent is extended or adjusted under 35 U.S.C. 154(b) by 291 days.

(21) Appl. No.: 15/809,611

(22) Filed: Nov. 10, 2017

(65) Prior Publication Data
US 2019/0147178 A1    May 16, 2019

(51) Int. Cl.
| | | |
|---|---|---|
| *G06F 21/62* | (2013.01) | |
| *H04L 12/58* | (2006.01) | |
| *G06F 21/31* | (2013.01) | |
| *H04L 29/06* | (2006.01) | |
| *G06F 21/10* | (2013.01) | |

(52) U.S. Cl.
CPC .......... *G06F 21/6209* (2013.01); *G06F 21/10* (2013.01); *G06F 21/31* (2013.01); *H04L 51/32* (2013.01); *H04L 63/101* (2013.01)

(58) Field of Classification Search
CPC ....... G06F 21/31; G06F 21/6209; H04L 51/32
See application file for complete search history.

(56) References Cited

U.S. PATENT DOCUMENTS

| | | | | |
|---|---|---|---|---|
| 8,275,790 | B2* | 9/2012 | Fredricksen | G06F 16/9574 707/782 |
| 9,813,260 | B1* | 11/2017 | Morgan | H04L 12/581 |
| 9,948,651 | B1* | 4/2018 | Shavell | H04L 67/22 |
| 10,375,060 | B1* | 8/2019 | Graves | H04L 67/02 |
| 2002/0002543 | A1* | 1/2002 | Spooren | G06F 21/10 705/57 |

(Continued)

OTHER PUBLICATIONS

"Link-richness—Wikipedia", 2 pages, printed Aug. 29, 2019. (Year: 2019).*
Asana Community; Attachments—Image instead of Link; https://community.asana.com/t/attachments-image-instead-of-link/1690; as accessed Sep. 22, 2017.

(Continued)

*Primary Examiner* — Ponnoreay Pich
(74) *Attorney, Agent, or Firm* — FisherBroyles, LLP

(57) ABSTRACT

The disclosed computer-implemented method may include (1) acquiring, from a user of a social networking system, a hyperlink to a protected content item, hosted by a content provider system, that is protected by an authentication protocol, (2) sending a request for metadata associated with the protected content item to the content provider system, where the request includes authentication information associated with the authentication protocol, (3) receiving, in response to the content provider system approving the request, metadata associated with the protected content item from the content provider system, where the metadata includes information sufficient to generate a preview of the protected content item, and (4) generating a preview of the protected content item based on the metadata received from the content provider system. Various other methods, systems, and computer-readable media are also disclosed.

20 Claims, 11 Drawing Sheets

(56) References Cited

U.S. PATENT DOCUMENTS

| | | | | |
|---|---|---|---|---|
| 2002/0035697 A1* | 3/2002 | McCurdy | ........... | G06F 21/10 |
| | | | | 726/3 |
| 2008/0115225 A1* | 5/2008 | Jogand-Coulomb | ... | G06F 21/10 |
| | | | | 726/27 |
| 2012/0011432 A1* | 1/2012 | Strutton | ........... | G06Q 30/02 |
| | | | | 715/234 |
| 2012/0311623 A1* | 12/2012 | Davis | ........... | H04N 5/765 |
| | | | | 725/18 |
| 2014/0365526 A1* | 12/2014 | Sato | ........... | G06F 21/6209 |
| | | | | 707/784 |
| 2015/0042823 A1* | 2/2015 | Relf | ........... | H04L 51/10 |
| | | | | 348/207.1 |
| 2015/0135261 A1* | 5/2015 | Park | ........... | H04L 63/102 |
| | | | | 726/1 |
| 2015/0220499 A1* | 8/2015 | Katic | ........... | G06F 16/957 |
| | | | | 715/207 |
| 2015/0220500 A1* | 8/2015 | Katic | ........... | G06F 16/957 |
| | | | | 715/207 |

OTHER PUBLICATIONS

Slack; Unfurling links in messages; https://api.slack.com/docs/message-link-unfurling; as accessed Sep. 22, 2017.

Curley; New stuff—YouTube/Twitter/CloudApp link previews and typing status; https://web.archive.org/web/20160315003240/https://blog.hipchat.com/2010/09/15/new-stuff-youtubetwittercloudapp-link-previews-and-typing-status/; as accessed on Sep. 22, 2017 (dated Sep. 15, 2010).

Webhooks—Graph API; https://developers.facebook.com/docs/graph-api/webhooks; as accessed on Sep. 25, 2017.

RFC 6749: OAuth 2.0 Authorization Framework; https://tools.ietf.org/html/rfc6749; published Oct. 2012.

RFC 2616: Hypertext Transfer Protocol—HTTP/1.1; https://tools.ietf.org/html/rfc2616; published Jun. 1999.

Webhook; https://en.wikipedia.org/wiki/Webhook; as accessed Sep. 22, 2017.

* cited by examiner

HTTP Request
400

```
402 ─POST https://example.com/callback HTTP/1.1
     Host: example.com
     Accept: application/json
404  Content-Type: application/json
     User-Agent: Webhooks/1.0 (https://example.com/webhooks)
408 ─X-Hub-Signature:  sha1=6886be95d2dc98cce12f1952e93a76b806b17856
     ...
410 ─{
       "object": "link",
       "entry": [
    416  {
418 ─   "time": 1501515097793,
420 ─   "community_id": 914584838617560,
    422 "user": {
424 ─     "id": 100014418434399,
          "email": "user@example.com"
        },
426 ─   "link": "https://example.com/protected-content-item"
       }
     ]
   }
```

HTTP Response
500

502 → HTTP/1.1 200 OK
504 {
  508 → ETag: 62253bc2-8558-588b184b3982b
  Content-Type: application/json
  510 → X-Hub-Signature: sha1=2f178d3e2fe0a0aab85bde1af969c5a6512b07d9
}
...
{
506 {
  512 → "data": [
  514 {
    {
      516 → "link": "https://example.com/protected-content-item",
      518 → "title": "Slides for Project A",
      520 → "snippet": "Short summary of the slides.",
      522 → "download_url": "https://example.com/download/Security-Presentation.pdf",
      524 → "privacy": {PUBLIC | RESTRICTED | PRIVATE | UNKNOWN}
                                        526
    }
  ]
}

FIG. 5

SYSTEMS AND METHODS FOR GENERATING PREVIEWS OF CONTENT PROTECTED BY AUTHENTICATION PROTOCOLS

BACKGROUND

When a user of a social networking system considers whether to share a content item with another user of the social networking system, it may be beneficial for the social networking system to generate and/or display a preview of the content item. For example, displaying a preview of the content item to a user prior to sharing the content item may confirm that the user has selected the correct content item. Additionally, a preview of a shared content item displayed to another user may influence the user to interact with (e.g., access, view, etc.) the shared content item.

However, when a user shares and/or attempts to share a content item that is protected by an authentication protocol, such as a content item hosted by a third-party content provider system, traditional preview generating systems may be unable to access and/or view the protected content item. This may cause the traditional preview generating systems to be unable to generate and/or display a preview of the protected content item. This may lead to decreased user engagement with shareable and/or shared content within the social networking system. For example, a user of a social networking system may be less likely to share a protected content item with other users of the social networking system, or another user of the social networking system may be less likely to interact with a protected content item that has been shared by the user. As such, the instant disclosure identifies and addresses a need for improved systems and methods for generating previews of content items that are protected by authentication protocols.

SUMMARY

As will be described in greater detail below, the instant disclosure describes various systems and methods for generating previews of content protected by authentication protocols by including authentication information in requests for metadata associated with protected content items, receiving metadata associated with the protected content items in response to the requests, and generating previews of the protected content items based on the received metadata.

In one example, a method for generating previews of content protected by authentication protocols may include (1) acquiring, from a user of a social networking system, a hyperlink to a protected content item (hosted by a content provider system) that is protected by an authentication protocol, (2) sending a request for metadata associated with the protected content item to the content provider system, where the request includes authentication information associated with the authentication protocol, (3) receiving, in response to the content provider system approving the request, metadata associated with the protected content item from the content provider system, where the metadata includes information sufficient to generate a preview of the protected content item, and then (4) generating a preview of the protected content item based on the metadata received from the content provider system.

In some embodiments, the method may further include obtaining access credentials for the protected content item from the user of the social networking system. In such embodiments, the request for metadata associated with the protected content item may further include the obtained access credentials.

In some examples, the method may further include presenting the generated preview of the protected content item to the user of the social networking system within a publishing interface of the social networking system. Such examples may further include receiving a direction from the user of the social networking system to publish the generated preview to a follower of the user in the social networking system.

In at least one example, the method may further include determining whether the follower of the user in the social networking system has permission to view the generated preview. In such examples, the method may further include (1) upon determining that the follower of the user has permission to view the generated preview, presenting the generated preview to the follower of the user and/or (2) upon determining that the follower of the user does not have permission to view the generated preview, presenting a modified preview to the follower of the user.

In some embodiments, determining that the follower of the user has permission to view the generated preview may include (1) receiving information representative of a list of approved users associated with the protected content item from the content provider system and (2) determining that the follower is in the list of approved users associated with the protected content item. In some examples, the information representative of the list of approved users associated with the protected content item may include a Bloom filter that is based on the list of approved users associated with the protected content item. In such examples, determining that the follower is in the list of approved users associated with the protected content item may include querying the Bloom filter.

In some examples, the method may further include associating an approved user in the list of approved users with an additional user of the social networking system based on an identifier associated with the approved user and an identifier associated with the additional user of the social networking system.

In at least one embodiment, determining that the follower of the user has permission to view the generated preview may include authorizing the follower with the content provider system via an Open Authentication flow.

In some embodiments, sending the request may include executing a hypertext transfer protocol (HTTP) GET request using the authentication information associated with the social networking system and the acquired hyperlink. In additional embodiments, sending the request may include executing an HTTP POST request using the authentication information associated with the social networking system and an HTTP webhook callback associated with the content provider system.

In some examples, the received metadata associated with the protected content item may further include (1) a portion of the protected content item, (2) a title of the protected content item, (3) an image associated with the protected content item, (4) an Open Graph property associated with the protected content item, and/or (5) a description of the protected content item. In some examples, the received metadata associated with the protected content item may include a privacy mode associated with the protected content item. In these examples, the privacy mode may include (1) a public mode indicating that the protected content item is publicly available, (2) a restricted mode indicating that the protected content item is available to the user, but not publicly available, (3) a private mode indicating that the protected content item is not available to the user, and/or (4) an unknown mode indicating that the protected content item is available to the user only when the user provides valid authentication credentials.

In some embodiments, generating the preview of the protected content item based on the metadata received from the content provider system may include determining whether the user of the social networking system has permission to view the preview of the protected content item based on the metadata received from the content provider system. In such embodiments, the method may further include, upon determining that the user of the social networking system has permission to view the preview of the protected content item, generating a rich preview of the protected content item and, upon determining that the user of the social networking system does not have permission to view the preview of the protected content item, generating a limited preview of the protected content item.

In some examples, the authentication information associated with the social networking system may include (1) an identifier associated with the social networking system and/or (2) an identifier associated with the user of the social networking system.

In at least one embodiment, a system for generating previews of content protected by authentication protocols may include an acquiring module, stored in memory, that acquires, from a user of a social networking system, a hyperlink to a protected content item, hosted by a content provider system, that is protected by an authentication protocol. The system may further include a sending module, stored in memory, that sends a request for metadata associated with the protected content item to the content provider system. The request may also include authentication information associated with the authentication protocol. The system may additionally include a receiving module, stored in memory, that receives, in response to the content provider system approving the request, metadata associated with the protected content item from the content provider system. The metadata may include information sufficient to generate a preview of the protected content item. The system may also include a generating module, stored in memory, that generates a preview of the protected content item based on the metadata received from the content provider system. The system may further include at least one physical processor that executes the acquiring module, the sending module, the receiving module, and the generating module.

In some examples, the system may further include a user interface module, stored in memory, that (1) presents the generated preview of the protected content item to the user of the social networking system within a publishing interface of the social networking system and (2) receives a direction from the user of the social networking system to publish the generated preview to a follower of the user in the social networking system.

In at least one example, the system may further include a determining module, stored in memory, that determines whether the follower of the user in the social networking system has permission to view the generated preview. Upon determining that the follower of the user has permission to view the generated preview, the determining module may present the generated preview to the follower of the user. Upon determining that the follower of the user does not have permission to view the generated preview, the determining module may present a modified preview to the follower of the user.

In at least one embodiment, sending the request may include executing (1) an HTTP GET request using the authentication information associated with the social networking system and the acquired hyperlink and/or (2) an HTTP POST request using the authentication information associated with the social networking system and an HTTP webhook callback associated with the content provider system.

In some examples, the metadata associated with the protected content item may include a privacy mode associated with the protected content item. In these examples, the privacy mode may include (1) a public mode indicating that the protected content item is publicly available, (2) a restricted mode indicating that the protected content item is available to the user, but not publicly available, (3) a private mode indicating that the protected content item is not available to the user, and/or (4) an unknown mode indicating that the protected content item is available to the user only when the user provides valid authentication credentials.

In some examples, the above-described method may be encoded as computer-readable instructions on a non-transitory computer-readable medium. For example, a non-transitory computer-readable medium may include one or more computer-executable instructions that, when executed by at least one processor of a computing device, may cause the computing device to acquire, from a user of a social networking system, a hyperlink to a protected content item, hosted by a content provider system, that is protected by an authentication protocol. The non-transitory computer-readable medium may further include one or more computer-executable instructions that, when executed by at least one processor of a computing device, may cause the computing device to send a request for metadata associated with the protected content item to the content provider system. In this example, the request may include authentication information associated with the authentication protocol. The non-transitory computer-readable medium may further include one or more computer-executable instructions that, when executed by at least one processor of a computing device, may cause the computing device to receive, in response to the content provider system approving the request, metadata associated with the protected content item from the content provider system. In this example, the metadata may include information sufficient to generate a preview of the protected content item. The non-transitory computer-readable medium may further include one or more computer-executable instructions that, when executed by at least one processor of a computing device, may cause the computing device to generate a preview of the protected content item based on the metadata received from the content provider system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIGS. 4-5 illustrate example HTTP requests and responses that a system for generating previews of content protected by authentication protocols may send and receive.

Figure 1:
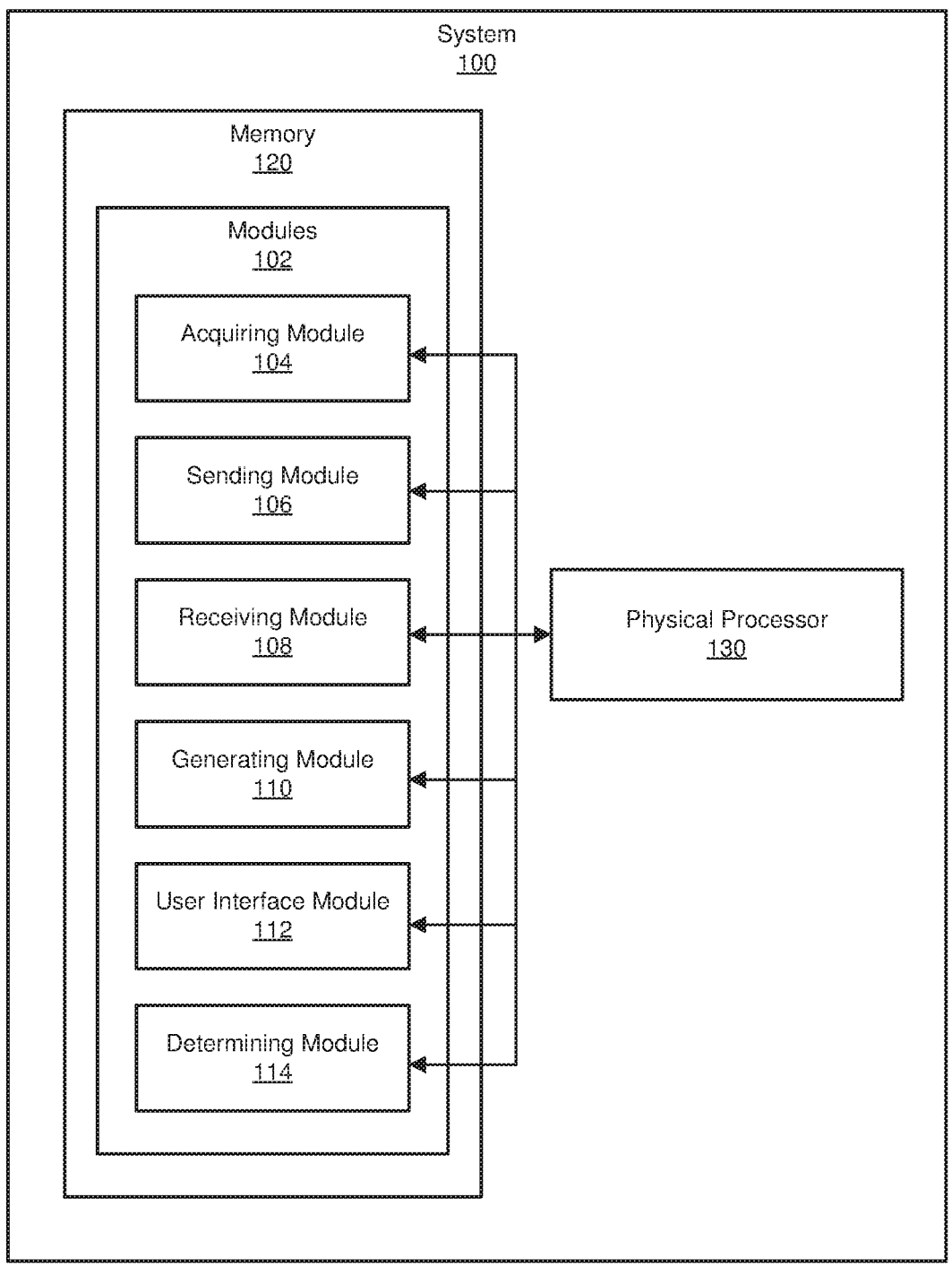
FIG. 1 is a block diagram of an example system for generating previews of content protected by authentication protocols.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for generating previews of content protected by authentication protocols. As will be explained in further detail below, embodiments of the instant disclosure may request metadata associated with a content item along with authentication information associated with an authentication protocol that protects the content item. This authentication information may prove to the content provider system that the social networking system and/or a user of a social networking system has permission to view metadata associated with the protected content item. Thus, embodiments of the instant disclosure may receive metadata associated with the protected content item that includes information sufficient to generate a preview of the protected content item, and may then generate a preview of the protected content item based on the received metadata.

Additionally, some embodiments of the instant disclosure may enable the user to publish a generated preview to a follower of the user in the social networking system. If the user chooses to publish the generated preview to the follower, embodiments of the systems and methods described herein may also determine whether the follower also has permission to view the generated preview. If the follower has such permission, embodiments of the systems and methods described herein may also present the generated preview to the follower of the user. Thus, the systems and methods of the instant disclosure may encourage sharing of and engagement with protected content items by users (e.g., users and followers of users) of a social networking system.

In addition, embodiments of the systems and methods described herein may also improve the functioning of a computing device. Presenting a preview of a protected content item to a user may improve a user's ability to determine whether the user actually wishes to access and/or share the protected content item. This may conserve network resources for transfer of data the user actually wishes to access and/or share. Embodiments of the systems and methods described herein may also improve interoperability of a social networking system and one or more content provider systems, and may therefore increase user engagement with content hosted by the one or more content provider systems. Other benefits and advantages of the systems and methods described herein will be made apparent by the description below.

The following will provide, with reference to FIGS. 1-2 and 4-11, detailed descriptions of systems for generating previews of content protected by authentication protocols. Detailed descriptions of corresponding computer-implemented methods will also be provided in connection with FIG. 3.

FIG. 1 is a block diagram of an example system 100 for generating previews of content protected by authentication protocols. As illustrated in this figure, example system 100 may include one or more modules 102 for performing one or more tasks. As will be explained in greater detail below, modules 102 may include an acquiring module 104 that acquires, from a user of a social networking system, a hyperlink to a protected content item, hosted by a content provider system, that is protected by an authentication protocol. Example system 100 may also include a sending module 106 that sends a request for metadata associated with the protected content item to the content provider system, the request including authentication information associated with the authentication protocol.

Additionally, example system 100 may include a receiving module 108 that receives, in response to the content provider system approving the request, metadata associated with the protected content item from the content provider system, the metadata including information sufficient to generate a preview of the protected content item. Example system 100 may also include a generating module 110 that generates a preview of the protected content item based on the metadata received from the content provider system.

In at least some embodiments, example system 100 may additionally include a user interface module 112 that presents the generated preview of the protected content item to the user of the social networking system within a publishing interface of the social networking system. User interface module 112 may also receive a direction from the user of the social networking system to publish the generated preview to a follower of the user in the social networking system.

In some examples, example system 100 may further include a determining module 114 that determines whether the follower of the user in the social networking system has permission to view the generated preview. If determining module 114 determines that the follower of the user has permission to view the generated preview, determining module 114 may present (e.g., via user interface module 112) the generated preview to the follower of the user. If determining module 114 determines that the follower of the user does not have permission to view the generated preview, determining module 114 may present (e.g., via user interface module 112) a modified preview to the follower of the user.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, or any other suitable storage memory.

As further illustrated in FIG. 1, exemplary system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate identifying and tracking application performance incidents. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Figure 2:
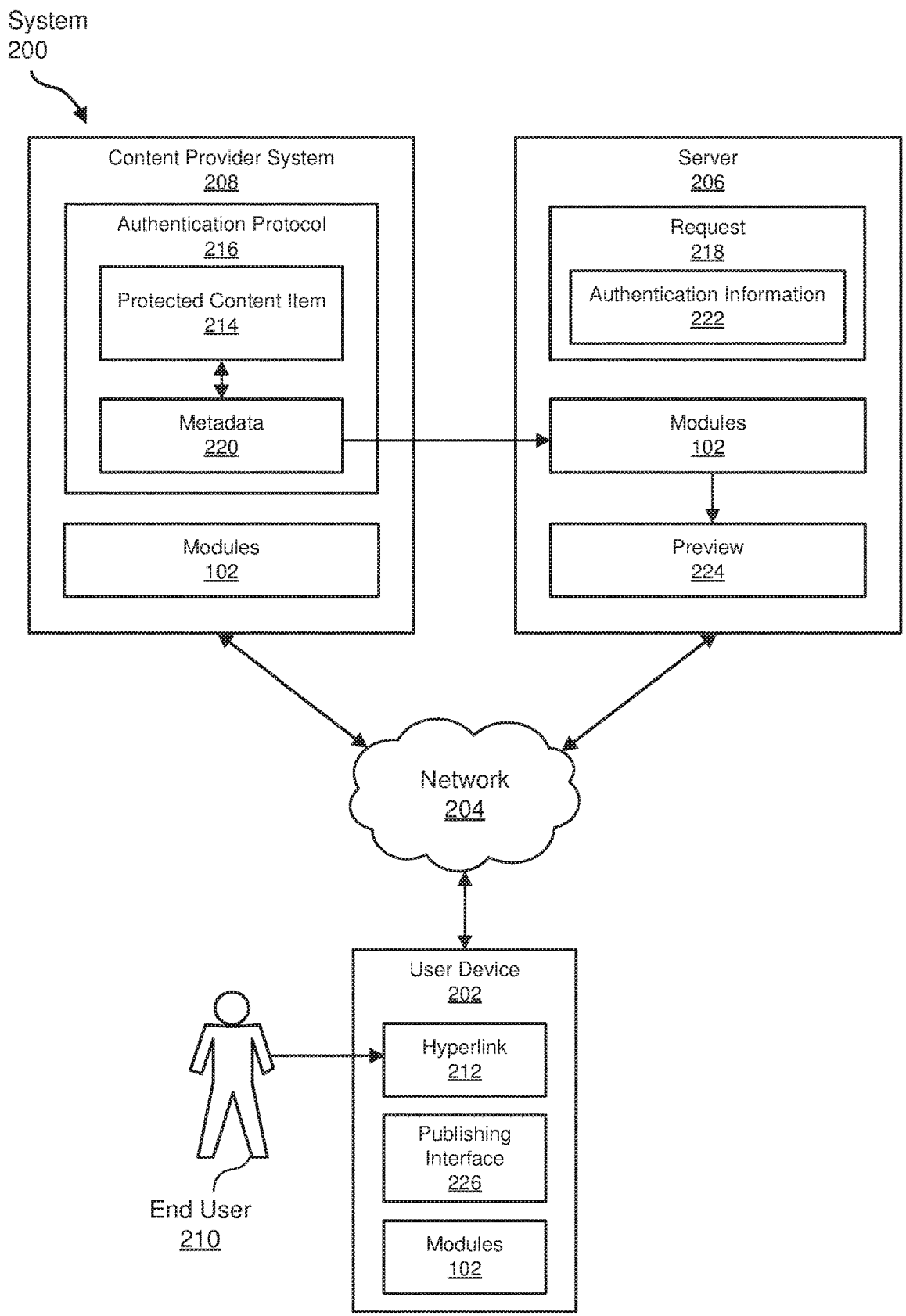
FIG. 2 is a block diagram of an example implementation of a system for generating previews of content protected by authentication protocols

Example system 100 in FIG. 1 may be implemented in a variety of ways. For example, all or a portion of example system 100 may represent portions of example system 200 ("system 200") in FIG. 2. As shown in FIG. 2, system 200 may include a user device 202 in communication with a server 206 and a content provider system 208 via network 204. In at least one example, server 206 may be programmed with one or more of modules 102. Additionally or alternatively, user device 202 and/or content provider system 208 may be programmed with one or more of modules 102.

In at least one embodiment, one or more modules 102 from FIG. 1 may, when executed by at least one processor of user device 202, server 206, and/or content provider system 208, enable user device 202, server 206, and/or content provider system 208 to perform one or more operations to generate previews of content protected by authentication protocols. For example, as will be described in greater detail below, acquiring module 104 may cause user device 202, server 206, and/or content provider system 208 to acquire, from a user of a social networking system (e.g., end user 210), a hyperlink (e.g., hyperlink 212) to a protected content item (e.g., protected content item 214), hosted by content provider system 208, that is protected by an authentication protocol (e.g., authentication protocol 216). Sending module 106 may cause user device 202, server 206, and/or content provider system 208 to send a request (e.g., request 218) for metadata associated with the protected content item (e.g., metadata 220) to content provider system 208. The request may include authentication information (e.g., authentication information 222) associated with the authentication protocol (e.g., authentication protocol 216).

As further illustrated in FIG. 2, receiving module 108 may cause user device 202, server 206, and/or content provider system 208 to receive, in response to content provider system 208 approving the request, metadata associated with the protected content item (e.g., metadata 220) from content provider system 208. The metadata may include information sufficient to generate a preview of the protected content item. Generating module 110 may further generate a preview of the protected content item (e.g., preview 224) based on the metadata received from content provider system 208 (e.g., metadata 220).

In at least one embodiment, user interface module 112 may cause user device 202, server 206, and/or content provider system 208 to present the generated preview of the protected content item (e.g., preview 224) to the user of the social networking system (e.g., end user 210) within a publishing interface of the social networking system (e.g., publishing interface 226). User interface module 112 may further cause user device 202, server 206, and/or content provider system 208 to receive a direction from the user of the social networking system (e.g., end user 210) to publish the generated preview (e.g., preview 224) to a follower of the user in the social networking system.

In additional embodiments, determining module 114 may cause user device 202, server 206, and/or content provider system 208 to determine whether the follower of the user has permission to view the generated preview. Upon determining that the follower of the user has permission to view the generated preview, determining module 114 may cause (e.g., via user interface module 112) user device 202, server 206, and/or content provider system 208 to present the generated preview (e.g., preview 224) to the follower of the user. Upon determining that the follower of the user does not have permission to view the generated preview, determining module 114 may cause (e.g., via user interface module 112) user device 202, server 206, and/or content provider system 208 to present a modified preview to the follower of the user.

User device 202 generally represents any type or form of computing device capable of reading computer-executable instructions, presenting a user interface to a user, and receiving input from the user. In at least one embodiment, user device 202 may accept one or more directions from server 206 and/or content provider system 208. Examples of user device 202 include, without limitation, desktop computers, laptops, tablets, cellular phones, (e.g., smartphones), personal digital assistants (PDAs), multimedia players, embedded systems, wearable devices (e.g., smart watches, smart glasses, etc.), gaming consoles, combinations of one or more of the same, or any other suitable mobile computing device.

Network 204 generally represents any medium or architecture capable of facilitating communication and/or data transfer between user device 202, server 206, and/or content provider system 208. Examples of network 204 include, without limitation, an intranet, a WAN, a LAN, a Personal Area Network (PAN), the Internet, Power Line Communications (PLC), a cellular network (e.g., a Global System for Mobile Communications (GSM) network, a code-division multiple access (CDMA) network, a Long-Term Evolution (LTE) network, etc.), universal serial bus (USB) connections, and the like. Network 204 may facilitate communication or data transfer using wireless or wired connections. In one embodiment, network 204 may facilitate communication between user device 202, server 206, and content provider system 208.

Server 206 generally represents any type or form of computing device capable of reading computer-executable instructions and/or hosting executables. Examples of server 206 include, without limitation, application servers, storage servers, database servers, web servers, and/or any other suitable computing device configured to run certain software applications and/or provide various testing, web, storage, and/or database services.

Content provider system 208 generally represents any type or form of computing device and/or system that stores content (e.g., one or more content items) and provides that stored content to one or more computing devices. Examples of content provider system 208 include, without limitation, storage servers, database servers, web servers, and/or any other suitable computing device and/or system configured to run certain software applications and/or provide various storage, access, and/or database services.

In at least one example, user device 202, server 206, and content provider system 208 may be computing devices programmed with one or more of modules 102. All or a portion of the functionality of modules 102 may be performed by user device 202, server 206, content provider system 208, and/or any other suitable computing system. As will be described in greater detail below, one or more of modules 102 from FIG. 1 may, when executed by at least one processor of user device 202, server 206, and/or content provider system 208, may enable user device 202, server 206, and/or content provider system 208 to generate previews of content protected by authentication protocols.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
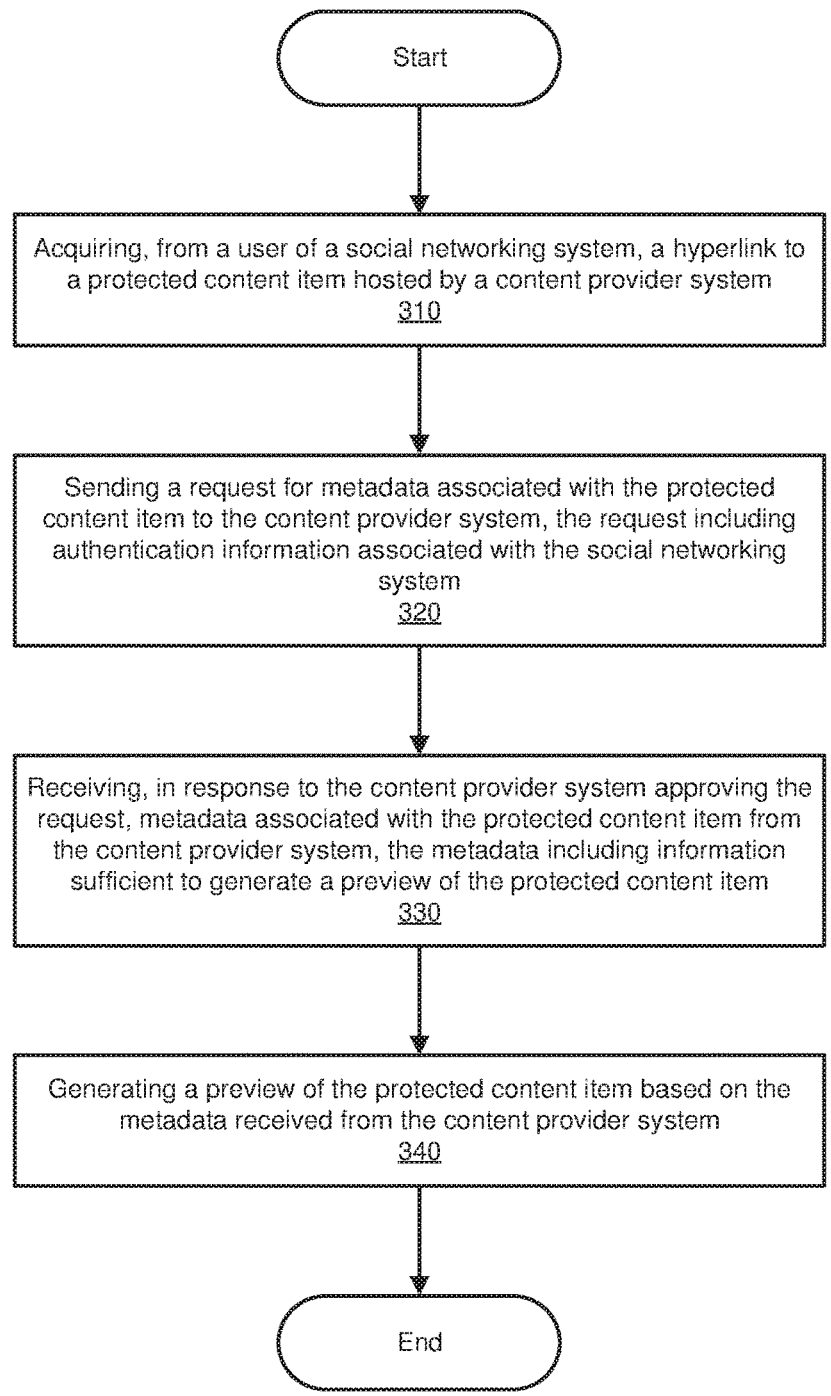
FIG. 3 is a flow diagram of an example method for generating previews of content protected by authentication protocols.

FIG. 3 is a flow diagram of an example computer-implemented method 300 for generating previews of content protected by authentication protocols. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple substeps, examples of which will be provided in greater detail below.

As illustrated in FIG. 3, at operation 310, one or more of the systems described herein may acquire, from a user of a social networking system, a hyperlink to a protected content item, hosted by a content provider system, that is protected by an authentication protocol. For example, acquiring module 104 may, as part of user device 202, acquire hyperlink 212 from end user 210. Hyperlink 212 may link to protected content item 214 that is hosted by content provider system 208 and is protected by authentication protocol 216.

The term "content" and/or "content item" may, in some examples, refer to any document, file, folder, task, calendar item, event invitation, contact item, project, media program, web site, collection, or any other data that may be hosted by content provider system 208. The term "hyperlink" may, in some examples, refer to any address, uniform resource locator (URL), or other identifier that may allow a user and/or computing system to locate a particular content item stored by a particular host (e.g., content provider system 208) and/or at a particular storage location.

The phrase "social networking system" may, in some examples, refer to any computing device and/or devices, software framework, and/or combination thereof usable for providing and/or hosting a service (e.g., via the Internet). In some examples, the phrase "social networking system" may refer to a computing system that provides a social networking service. In addition, the phrase "social networking service" may, in some examples, refer to any service and/or Internet site that manages social connections and/or shares, compiles, formats, and/or broadcasts information based on social connections. In some examples, the online service may host data and/or process the data via cloud-based applications (e.g., web-based email clients, online calendar applications, online picture albums, etc.) for personal and/or private use. Additionally or alternatively, the phrase "social networking service" may, in some examples, refer to any of a variety of online services that enable users to submit, post, and/or transmit messages and that maintain information about users. For example, the phrase "social networking service" may refer to online shopping services, online gaming services, and online entertainment services, etc.

Acquiring module 104 may acquire a hyperlink to a protected content item from a user of a social networking system in a variety of ways and/or contexts. For example, acquiring module 104 may direct user device 202 to present a user interface to end user 210. The presented user interface may allow end user 210 to manually enter hyperlink 212 to protected content item 214 stored by content provider system 208. In some examples, the user interface may be part of an interface of the social networking system, such as a publishing interface, a newsfeed interface, a messaging interface, a web-based e-mail interface, variations or combinations of one or more of the same, or any other suitable user interface.

Additionally or alternatively, one or more applications executing on user device 202 may provide hyperlink 212 to acquiring module 104 at the direction of end user 210. For example, a file storage application executing on user device 202 may allow end user 210 to "share" a document stored by content provider system 208 with a follower of end user 210 in a social network system. If end user 210 elects to "share" the document, the file storage application may provide a hyperlink to the document (e.g., hyperlink 212) to acquiring module 104.

In at least one embodiment, one or more of the systems described herein may also, upon acquiring hyperlink 212 to protected content item 214, obtain access credentials for protected content item 214 from end user 210. For example, one or of modules 102 (e.g., acquiring module 104, user interface module 112, etc.) may, as part of user device 202, obtain access credentials for protected content item 214 from end user 210. As will be described in greater detail below, in such examples, a subsequent request 218 for metadata 220 associated with protected content item 214 may include the acquired access credentials as part of authentication information 222.

Modules 102 may obtain access credentials for the protected content item from the user of the social networking system in a variety of ways. For example, upon acquiring hyperlink 212 from end user 210, acquiring module 104 may attempt to access protected content item 214 by using hyperlink 212 as part of an HTTP request. In response, acquiring module 104 may receive an HTTP response that indicates that authentication information may be required in order to access protected content item 214 (e.g., an HTTP response with a status code of "401 Unauthorized," "403 Forbidden," etc.). Acquiring module 104 may then, via user interface module 112 and user device 202, present an authentication user interface to end user 210. End user 210 may then provide access credentials for protected content item 214 via the presented authentication user interface. As will be described in additional detail below, the obtained access credentials may then be included as part of request 218 (e.g., as part of authentication information 222).

By acquiring a hyperlink to a protected content item, the systems and methods described herein may identify a particular content item that may be protected by an authentication protocol, and may then request metadata associated with the protected content item from content provider system 208 in order to generate a preview of the protected content item.

Returning to FIG. 3, at operation 320, one or more of the systems described herein may send a request for metadata associated with the protected content item to the content provider system, the request including authentication information associated with the authentication protocol. For example, sending module 106 may, as part of user device 202, server 206, and/or content provider system 208 in FIG. 2, send request 218 that includes authentication information 222 to content provider system 208 via network 204.

The term "authentication protocol" may, in some examples, refer to any system, method, process, or device that prevents entities (e.g., users, servers, organizations, etc.) from accessing and/or viewing data (e.g., content) protected by the authentication protocol without first providing suitable authentication information.

The term "authentication information" may, in some examples, refer to any information that may be provided by an entity to a content provider system that may allow the content provider system to determine whether the entity has permission to access and/or view data protected by an authentication protocol. Examples of authentication information may include, without limitation, a token, a signature, a certificate, a username, a password, a passphrase, variations or combinations of one or more of the same, or any other suitable information that may be used by content provider system 208 to determine whether an entity has permission to access a particular protected content item. As an example, content provider system 208 may issue access credentials (e.g., a username and password) to end user 210. As described above, acquiring module 104 may obtain the access credentials from end user 210, and include the obtained access credentials as part of request 218.

In at least some examples, authentication information 222 may include an identifier associated with the social networking system. For example, content provider system 208 may issue an identifier (e.g., a token, a signature, a certificate, etc.) to the social networking system in order to facilitate access to protected content item 214. Sending module 106 may therefore include the identifier associated with the social networking system as part of authentication information 222. In some additional examples, authentication information 222 may include an identifier associated with the user of the social networking system. For example, the social networking system may issue an identifier associated with end user 210, such as a user identifier, a hashed value, a username, an email address, etc, and may communicate that identifier to content provider system 208. Content provider system 208 may include receiving the identifier as part of authentication protocol 216. Sending module 106 may therefore include the identifier associated with the user of the social networking system as part of authentication information 222.

Sending module 106 may send request 218 to content provider system 208 in a variety of ways and contexts. For example, sending module 106 may send the request to content provider system 208 by executing an HTTP GET request using the authentication information (e.g., authentication information 222) and the acquired hyperlink (e.g., hyperlink 212). Sending module 106 may address the GET request to a uniform resource locator (URL) associated with the hyperlink, and include authentication information 222 as part of the GET request (e.g., as part of a header of the GET request, as part of a message body of the GET request, and so forth). Content provider system 208 may approve the request (e.g., by evaluating authentication information 222) and, in response, content provider system 208 may send, and receiving module 108 may receive, an HTTP response that includes metadata 220.

As another example, sending module 106 may send request 218 as an HTTP POST request to a webhook callback associated with content provider system 208. In some examples, a "webhook callback" may be any service that, when an event occurs, submits data to a specific URL. For example, sending module 106 may generate request 218 that includes authentication information 222, and may send an HTTP POST request that includes request 218 to a webhook callback associated with content provider system 208. Content provider system 208 may then be configured to, after approving the request (e.g., by evaluating authentication information 222), respond to such a POST request with an HTTP response that includes metadata 220 associated with protected content item 214.

By way of illustration, FIG. 4 shows an example HTTP request 400 that sending module 106 may send to content provider system 208. As shown, HTTP request 400 includes request line 402, request headers 404, and message body 406. Request line 402 includes a POST method token that indicates that the method to be performed on the target resource is a POST method, a request Uniform Resource Identifier (URI) that identifies webhook callback https://example.com/callback as the target resource of the request, and an HTTP-Version protocol parameter of "HTTP/1.1" that indicates that HTTP request 400 complies with version 1.1 of HTTP.

Request headers 404 may include various headers that include additional information about the request. One example is X-Hub-Signature header 408, which may contain an SHA-1 signature of message body 406 generated using a "secret" shared between sending module 106 and content provider system 208. Content provider system 208 may use X-Hub-Signature header 408 to validate the integrity and origin of message body 406.

Message body 406 is a JavaScript Object Notation (JSON) object that includes two key-value pairs: key-value pair 410 and key-value pair 412. Key-value pair 410 has a key of "object" and a value of "link." Key-value pair 410 may indicate a particular topic (e.g., target) for the webhook callback. Key-value pair 412 has a key of "entry" and a value of JSON object 414. JSON object 414 includes four key-value pairs. Key-value pair 416 has a key of "time" and a value of "1501515097793." Key-value pair 416 may thus indicate a time associated with HTTP request 400, or any other suitable time. Key-value pair 418 has a key of "community_id" and a value of "914584838617560." Key-value pair 418 may thus indicate an identifier associated with the social networking system (e.g., a community of within the social networking system). Additionally or alternatively, key-value pair 418 may indicate an identifier associated with content provider system 208, end user 210, and/or any other identifiable object.

Key-value pair 420 has a key of "user" and a value that includes key-value pair 422 and key-value pair 424. Key-value pair 420 may include information associated with end user 210. As shown, key-value pair 422 has a key of "id" and a value of "100014418434399." Key-value pair 422 may thus indicate an identifier (i.e., "100014418434399") associated with end user 210 in the social networking system, such as a scoped identifier that identifies end user 210 within a particular application associated with the social networking system (e.g., an "app-scoped ID"). In some examples, the identifier indicated by key-value pair 422 may also be associated with content provider system 208. For example, content provider system 208 may provide an application that interfaces with the social networking system. The identifier indicated in key-value pair 422 may correlate end user 210 with an authenticated user of the application provided by content provider system 208 that interfaces with the social networking system.

As further shown in FIG. 4, key-value pair 424 has a key of "email" and a value of "user@example.com." Key-value pair 424 may thus indicate an e-mail address ("user@example.com") associated with end user 210. The e-mail address indicated by key-value pair 422 may also serve to identify end user 210 within the social networking system. Additionally, key-value pair 426 has a key of "link" and a value of "https://example.com/protected-content-item." Key-value pair 424 may therefore indicate a hyperlink or URL directed to protected content item 214 (e.g., "https://example.com/protected-content-item").

Any of the information included in HTTP request 400 may be used by content provider system 208 to determine whether to approve the request to view metadata 220 associated with protected content item 214. For example, the identifier indicated by key-value pair 418 (i.e., "100014418434399"), the information included in key-value pair 420, and/or the information indicated by X-Hub-Signature header 408, may be sufficient to authenticate request 218 in accordance with authentication protocol 216, and may allow content provider system 208 to approve the request to view metadata 220.

In some embodiments, HTTP request 400 may include additional or alternative authentication information. For example, HTTP request 400 may include any suitable token, signature, certificate, username, password, passphrase, or any other suitable authentication information that content provider system 208 may use to determine whether end user 210 and/or modules 102 have permission to access and/or view metadata 220 associated with protected content item 214.

By sending a request for metadata associated with a protected content item that includes authentication information associated with an authentication protocol that protects the protected content item, the systems and methods described herein may be able to provide sufficient authentication information to satisfy the requirements of the authentication protocol that protects the protected content item. Thus, the content provider system may securely and safely permit embodiments of the instant systems and methods to receive metadata associated with the content item in order to generate a preview of the protected content item.

Returning to FIG. 3, at operation 330, one or more of the systems described herein may receive, in response to the content provider system approving the request, metadata associated with the protected content item from the content provider system, the metadata including information sufficient to generate a preview of the protected content item. For example, receiving module 108 may, as part of user device 202, server 206, and/or content provider system 208 in FIG. 2, receive, in response to content provider system 208 approving request 218, metadata associated with the protected content item (e.g., metadata 220) from content provider system 208. Metadata 220 may include information sufficient to generate a preview of the protected content item (e.g., preview 224).

The term "metadata" may, in some examples, refer to data that describes and/or includes information associated with a particular content item. For example, metadata 220 may include information associated with protected content item 214 including, without limitation, a portion of protected content item 214, a title of protected content item 214, an image associated with of protected content item 214, such as a preview image of protected content item 214, a hyperlink to a data object associated with protected content item 214, a description of protected content item 214, an Open Graph property associated with protected content item 214, and/or any other information associated with protected content item 214. As will be described in greater detail below in connection with FIG. 5, metadata 220 may also include a privacy mode associated with protected content item 214.

In some examples, metadata included in metadata 220 may be related to a type of object that may be included in protected content item 214. For example, if protected content item 214 includes a file, metadata 220 may include a title of the file, a thumbnail image of the file, a file type of the file, etc. As another example, if protected content item includes a task item, metadata 220 may include a title of the task item, an owner of the task item, a priority of the task item, and a due date of the task item. As a further example, if protected content item 214 includes an event invitation, metadata 220 may include a title of the event invitation, a list of attendees of the event, a time of the event, and a duration of the event.

Receiving module 108 may receive metadata associated with a protected content item (e.g., metadata 220) from content provider system 208 in a variety of ways. For example, as described above, sending module 106 may send request 218 to content provider system 208 by executing an HTTP GET request using authentication information 222 and hyperlink 212. If content provider system 208 approves request 218, content provider system 208 may respond by sending an HTTP response to receiving module 108 that includes metadata 220. For example, content provider system 208 may send an HTTP response that indicates that the request has succeeded (e.g., with a "200 OK" status code) and that includes a portion of protected content item 214 as part of metadata 220.

As another example, as described above, sending module 106 may send request 218 to content provider system 208 by executing an HTTP POST request using authentication information 222 to a webhook callback associated with content provider system 208. If content provider system 208 approves request 218, content provider system 208 may respond by sending an HTTP response to receiving module 108 that includes metadata 220. For example, content provider system may send an HTTP response that indicates that the request has succeeded (e.g., with a "200 OK" status code) and that includes metadata 220.

By way of illustration, FIG. 5 shows an example HTTP response 500 that receiving module 108 may receive in response to content provider system 208 approving the HTTP POST request illustrated in FIG. 4. As will be described in greater detail below, any of the information included in HTTP response 500 may be included in metadata 220, and may therefore be used to generate preview 224.

As shown, HTTP response 500 includes status line 502, response headers 504, and entity body 506. Status line 502 includes an HTTP-Version protocol parameter of "HTTP/1.1" that indicates that HTTP response 500 complies with version 1.1 of HTTP. Status line 502 also includes a status code "200" and a reason phrase "OK" which both indicate that HTTP request 400 has succeeded.

Response headers 504 may include information about the server (e.g., content provider system 208) and about further access to the resource identified by the URI included in HTTP request 400 (e.g., https://example.com/callback). For example, the value associated with ETag header 508 may be used for web cache validation. Response headers 504 may also include X-Hub-Signature header 510, which, like X-Hub-Signature header 408 in FIG. 4, may contain an SHA-1 signature of entity body 506 generated using a "secret" shared between receiving module 108 and content provider system 208. Receiving module 108 may use X-Hub-Signature header 510 to validate the integrity and origin of entity body 506.

Entity body 506 is a JSON object that includes key-value pair 512. Key-value pair 512 has a key of "data" and a value of JSON object 514. JSON object 514 includes key-value pairs 516 through 524. Key-value pair 516 has a key of "link" and a value of "https://example.com/protected-content-item," which may be the same as key-value pair 424 in HTTP request 400, and may therefore also be a link to protected content item 214.

Key-value pair 518 has a key of "title" and a value of "Slides for Project A." Key-value pair 518 may thus indicate a title of protected content item 214. Key-value pair 520 has a key of "snippet" and a value of "Short summary of the slides." Key-value pair 520 may thus indicate a snippet of text associated with protected content item 214 (e.g., a summary of protected content item 214). Key-value pair 522 has a key of "download_url" and a value of "https://example.com/download/Security-Presentation.pdf." Key-value pair 522 may thus indicate a URI that a file associated with protected content item 214 (e.g., an image associated with protected content item 214, a copy of protected content item 214, etc.) may be downloaded from. Key-value pair 522 may also indicate a file name associated with protected content item 214: "Security-Presentation.pdf."

Key-value pair 524 has a key of "privacy" and a value of at least one of privacy modes 526. Privacy modes 526 may indicate a user and/or a group of users that may access the metadata associated with protected content item 214, and thus may view preview 224. As will be described in greater detail below, determining module 114 may utilize privacy modes 526 to determine whether a follower of end user 210 has permission to view preview 224. Privacy modes 526 may include: (1) a public mode (i.e., "PUBLIC"), that indicates that protected content item 214 is publicly available, (2) a restricted mode (i.e., "RESTRICTED") that indicates that protected content item 214 is available to end user 210, but not publicly available, (3) a private mode (i.e., "PRIVATE") that indicates that protected content item 214 is not available to end user 210, or an unknown mode ("UNKNOWN") that indicates that protected content item 214 is available to end user 210 only when end user 210 provides valid authentication credentials.

By receiving, in response to the content provider system approving the request, metadata associated with the protected content item from the content provider system, the systems and methods described herein may acquire sufficient information from the content provider system to generate a preview of the protected content item.

Returning to FIG. 3, at operation 340, one or more of the systems described herein may generate a preview of the protected content item based on the metadata received from the content provider system. For example, generating module 110 may, as part of user device 202, server 206, and/or content provider system 208 in FIG. 2, generate a preview of the protected content item (e.g., preview 224) based on metadata 220 received from content provider system 208.

Generating module 110 may generate a preview of a protected content item based on the metadata received from the content provider system in a variety of ways and contexts. In some embodiments, generating module 110 may parse and/or analyze metadata 220 to identify one or more portions of metadata 220 to include in preview 224. For example, metadata 220 may include a hypertext markup language (HTML) representation of a portion of protected content item 214. In such examples, generating module 110 may analyze the HTML representation of the portion of protected content item 214 to identify one or more HTML tags, attributes, elements, and so forth to include in preview 224, such as a title, a summary, an image, etc. For example, metadata 220 may include a <title> tag, which generating module 110 may use as a title for preview 224, or an <image> tag, which generating module 110 may use to identify an image to include in preview 224.

In some embodiments, an administrator of content provider system 208 may include specific metadata tags within an HTML representation of a portion of protected content item 214 that generating module 110 may use to generate preview 224. For example, the Open Graph protocol, created at FACEBOOK of Menlo Park, Calif., may allow developers to include additional metadata within an HTML representation of a portion of protected content item 214. An administrator may include such Open Graph metadata within metadata 220, which generating module 110 may use to generate preview 224. For example, metadata 220 may include an Open Graph property of og:title, which generating module 110 may use as a title for preview 224, or an Open Graph property of og:image, which generating module 110 may use to identify an image to include in preview 224.

Any suitable Open Graph property may be included within metadata 220 including, without limitation, og:title, which may indicate a title of protected content item 214, og:type, which may indicate a type associated with protected content item 214, og:image, which may indicate a URL of an image that may represent protected content item 214, and og:url, which may indicate a canonical URL of protected content item 214 and may be used as a permanent identifier for protected content item 214 within a social graph.

Figure 6:
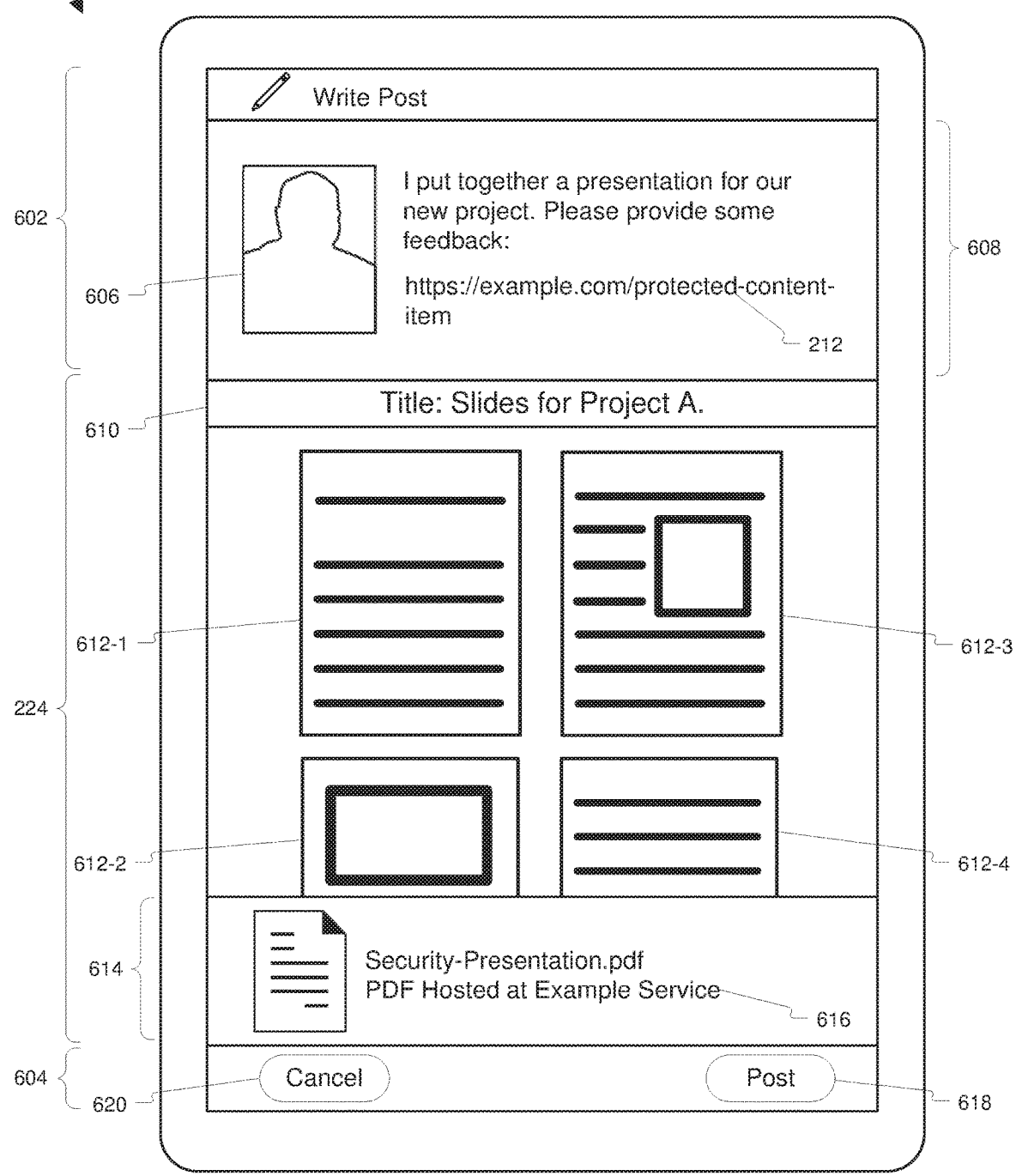
FIG. 6 illustrates a publishing interface that includes an example preview of a protected content item that may be generated based on metadata received from a content provider system.

Generating module 110 may include any suitable information within preview 224, including, without limitation, text, images, hyperlinks, media content, and so forth. To illustrate, FIG. 6 shows publishing interface 226 that user interface module 112 may present to end user 210 and that includes preview 224. As shown, publishing interface 226 includes input interface 602, preview 224, and publishing controls 604.

Input interface 602 includes a user image 606 that may represent end user 210 and an input area 608 where end user 210 may enter hyperlink 212 to protected content item 214. As described above, acquiring module 104 may acquire hyperlink 212 from end user 210 via input interface 602. Sending module 106 may then send request 218 to content provider system 208 via HTTP request 400. Receiving module 108 may then receive, in response to content provider system 208 approving request 218, metadata 220 via HTTP response 500, and generating module 110 may generate preview 224 based on metadata 220.

Preview 224 may include any suitable information and/or content that may serve to preview protected content item 214 to a user of a social networking system (e.g., end user 210, a follower of end user 210, etc.). As shown in FIG. 6, preview 224 may include a title 610 that generating module 110 may generate based on key-value pair 518 ("title": "Slides for Project A"). Preview 224 may also include images 612 (i.e., image 612-1 through 612-4) that are associated with protected content item 214. For example, images 612 may be thumbnail images associated with protected content item 214. As another example, images 612 may be snippets of (e.g., segments or portions of) protected content item 214.

Preview 224 may also include a message 614 that may indicate a file type and/or file name of protected content item 214 and a hosting message 616 that may indicate where protected content item 214 is hosted (e.g., by content provider system 208). In this illustration, message 614 indicates that protected content item 214 is a portable document format (PDF) file with a file name of "Security-Presentation.pdf" hosted at Example Service.

In some examples, generating module 110 may generate at least a portion of preview 224 by accessing and/or analyzing a file associated with protected content item 214 that may be included in or referenced by metadata 220. In the example illustrated in FIG. 5 and FIG. 6, for instance, generating module 110 may execute an additional HTTP GET request using the URI referenced by key-value pair 522, and generate images 612 by analyzing and/or accessing a file it receives in response to the additional HTTP GET request. Any element of preview 224 may be generated in a similar fashion.

Continuing with the example illustrated by FIG. 6, in some embodiments, publishing interface 226 may also include publishing controls 604 that include post button 618 and cancel button 620. Publishing controls 604 may enable end user 210 to provide a direction to user interface module 112 to publish the generated preview to a follower of end user 210 in the social networking system. For example, if end user 210 selects post button 618, preview 224 may be published to a follower of end user 210 in the social networking system. If end user 210 selects cancel button 620, preview 224 may not be shared with a follower of end user 210 in the social networking system.

In some embodiments, generating module 110 may generate preview 224 by determining whether end user 210 has permission to view preview 224 based on metadata 220. For example, if a privacy mode for protected content item 214 indicated by key-value pair 524 indicates that protected content item 214 is available to the public or available to the user but not the general public (e.g., the privacy mode is "PUBLIC" or "RESTRICTED"), generating module 110 may determine that end user 210 has permission to view a preview of protected content item 214. In this case, generating module 110 may generate preview 224 by including any or all of the elements described above. In such an example, preview 224 may be referred to as a "rich preview."

However, if a privacy mode for protected content item 214 indicated by key-value pair 524 indicates that protected content item 214 is not available to end user 210 (e.g., the privacy mode is "PRIVATE" or "UNKNOWN" or content provider system 208 did not approve request 218), generating module 110 may determine that end user 210 does not have permission to view a preview of protected content item 214. In such a case, generating module 110 may generate a preview by omitting some or all of the above elements described above from a preview 224. In such an example, the generated preview may be referred to as a "limited" or "modified" preview. An example of a limited or modified preview will be described below in reference to FIG. 9.

In some examples, generating module 110 may generate a plurality of previews of protected content item 214 based on metadata 220, and store them in a suitable storage location (e.g., within memory 120). One or more of modules 102 (e.g., generating module 110, user interface module 112, determining module 114, etc.) may then selectively present a preview from the plurality of stored previews based on whether a user of a social networking system (e.g., end user 210 or a follower of end user 210) has permission to view the stored preview. Such examples may be beneficial in that they may require less data to be transferred from content provider system 208, and/or fewer interactions between modules 102 and content provider system 208.

For example, as described above, generating module 110 may generate a rich preview of protected content item 214 and a limited preview of protected content item 214. If a user (e.g., end user 210 or a follower of end user 210) has permission to view a rich preview of protected content item 214, one or more modules 102 (e.g., user interface module 112, determining module 114, etc.) may present the stored rich preview to the user. If the user does not have permission to view a rich preview of protected content item 214, one or more modules 102 (e.g., user interface module 112, determining module 114, etc.) may present the stored limited preview to the user. Such stored previews may be time-limited, and thus may be re-generated periodically.

Figure 7:
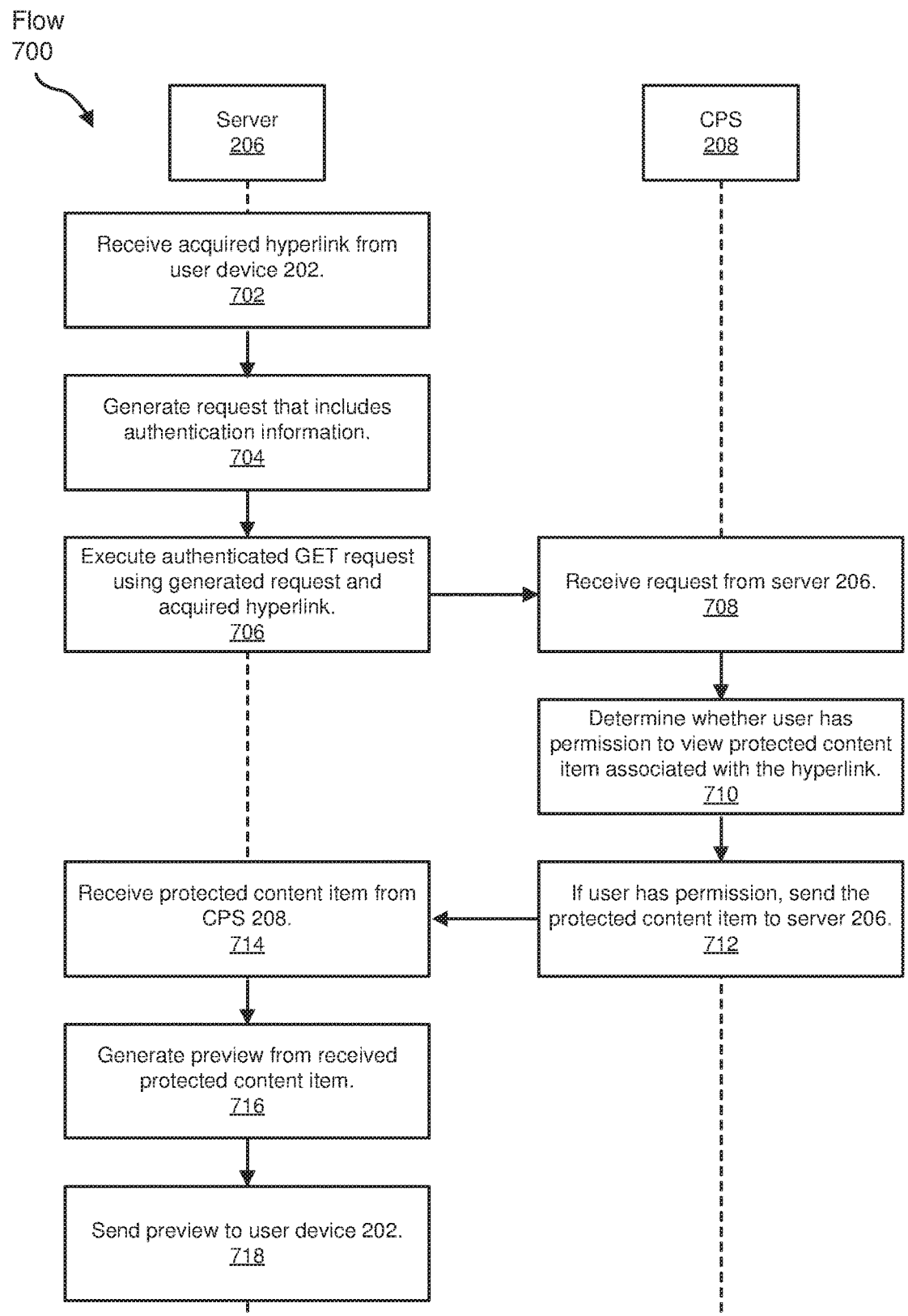
FIGS. 7-8 illustrate example operational flows for sending a request for metadata associated with a protected content item, receiving metadata associated the protected content item, and generating a preview of the protected content item based on the received metadata.

FIG. 7 illustrates an example operational flow 700 for sending a request for metadata associated with a protected content item, receiving metadata associated the protected content item, and generating a preview of the protected content item based on the received metadata. As shown, beginning at step 702, server 206 receives an acquired hyperlink (e.g., hyperlink 212) from user device 202. At step 704, server 206 generates a request (e.g., request 218) that includes authentication information (e.g., authentication information 222). At step 706, server 206 executes an authenticated GET request using the generated request (e.g., request 218) and the acquired hyperlink (e.g., hyperlink 212).

At step 708, content provider system 208 ("CPS 208" in FIG. 7) receives the request from server 206, and in step 710, content provider system 208 determines whether the user (e.g., end user 210) has permission to view the protected content item associated with the hyperlink (e.g., protected content item 214). At step 712, if content provider system 208 determines that the user has permission to view the protected content item, content provider system 208 sends the protected content item to server 206.

At step 714, server 206 receives the protected content item from content provider system 208. At step 716, server 206 generates a preview from the received protected content item. At step 718, server 206 sends the preview to user device 202.

Figure 8:
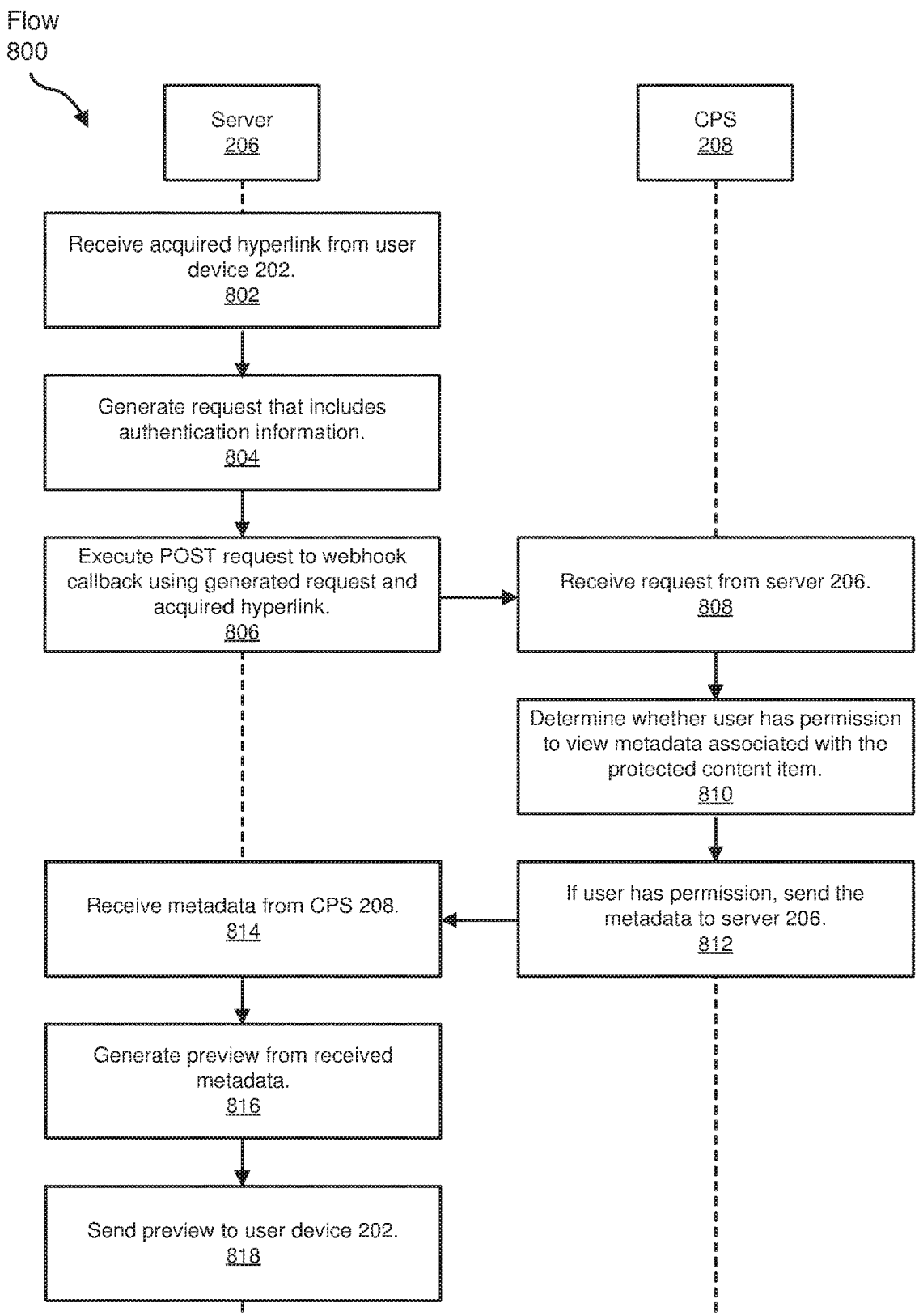

FIG. 8 illustrates an additional example operational flow 800 for sending a request for metadata associated with a protected content item, receiving metadata associated the protected content item, and generating a preview of the protected content item based on the received metadata. As shown, beginning at step 802, server 206 receives an acquired hyperlink (e.g., hyperlink 212) from user device 202. At step 804, server 206 generates a request (e.g., request 218) that includes authentication information (e.g., authentication information 222). At step 806, server 206 executes a POST request to a webhook callback using generated request and acquired hyperlink.

At step 808, content provider system 208 ("CPS 208" in FIG. 8) receives the request from server 206, and in step 810, content provider system 208 determines whether the user (e.g., end user 210) has permission to view metadata associated with the protected content item. At step 812, if content provider system 208 determines that the user has permission to view the protected content item, content provider system 208 sends the metadata (e.g., metadata 220) to server 206.

At step 814, server 206 receives the metadata from content provider system 208. At step 816, server 206 generates a preview from the received protected content item. At step 818, server 206 sends the preview to user device 202.

In at least some embodiments, one or more of the systems described herein may also determine whether a follower of a user in a social networking system has permission to view a generated preview. Upon determining that the follower of the user has permission to view the generated preview, one or more of the systems described herein may present the generated preview to the follower of the user. Similarly, upon determining that the follower of the user does not have permission to view the generated preview, one or more of the systems described herein may present a modified preview to the follower of the user.

For example, determining module 114 may, as part of user device 202, server 206, or content provider system 208, determine whether a follower of end user 210 in a social networking system has permission to view preview 224. Upon determining that the follower has permission to view preview 224, determining module 114 (e.g., via user interface module 112) may present preview 224 to the follower of the user in a suitable user interface. However, upon determining that the follower of the user does not have permission to view preview 224, determining module 114 (e.g., via user interface module 112) may present a modified preview to the follower.

Figure 9:
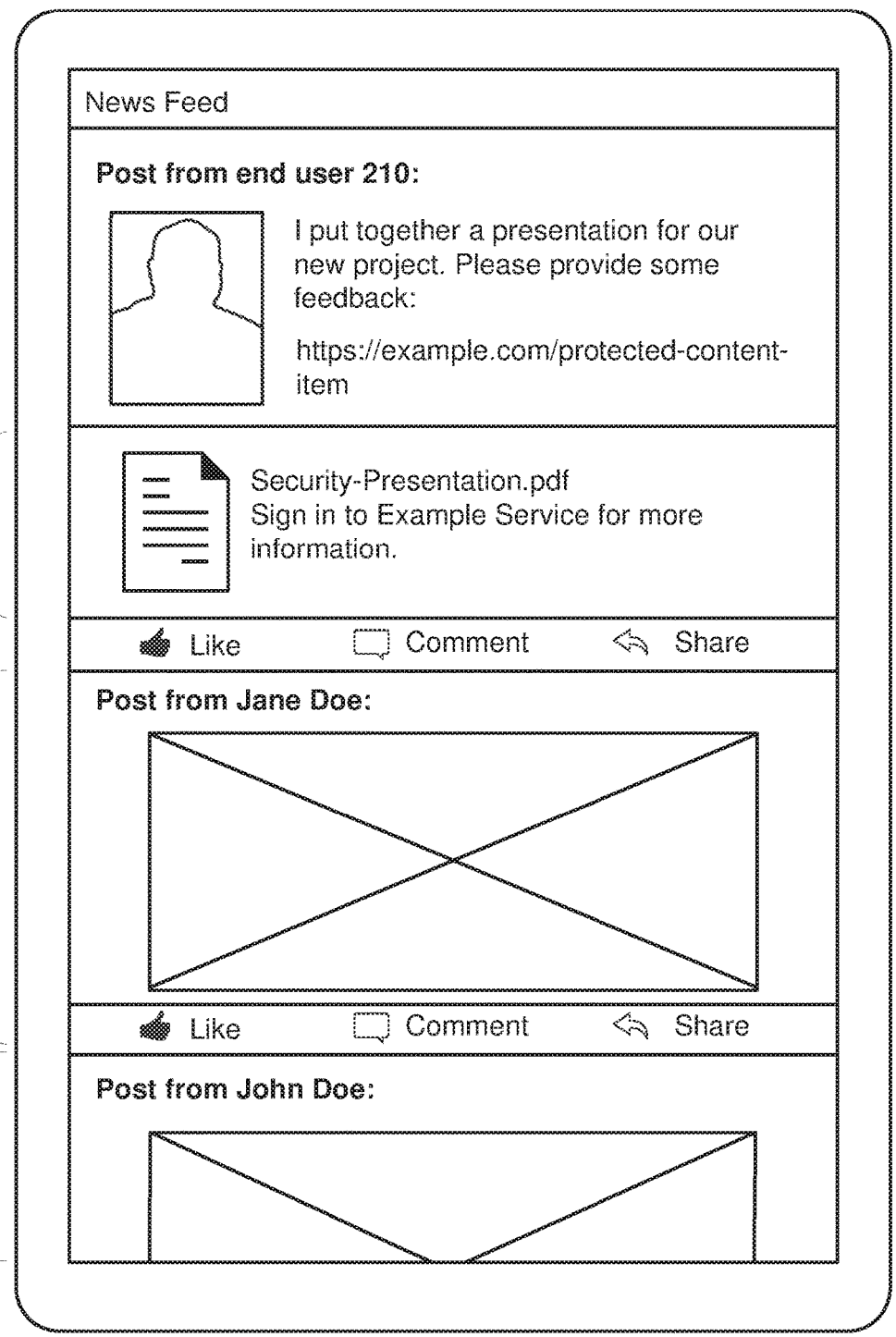
FIG. 9 illustrates an example operational flow for determining, by using a Bloom filter, that a follower of a user in a social networking system has permission to view a generated preview.

By way of illustration, FIG. 9 shows an example follower interface 900 of a social networking system that one or more of modules 102 (e.g., user interface module 112) may present to a follower of end user 210 who does not have permission to view preview 224. As shown, follower interface 900 includes a news feed 902 that includes end user post 904 along with additional posts 906 (e.g., additional post 906-1 and additional post 906-2). Additional posts 906 may relate to items in news feed 902 that are unrelated to protected content item 214.

End user post 904 may represent the post illustrated by publishing interface 226 after end user 210 has elected to publish preview 224 to the follower. End user post 904 includes modified preview 908. As is readily apparent, modified preview 908 is configured differently than preview 224, and omits some of the elements included in preview 224. In this illustration, modified preview 908 includes a message that includes a file name of protected content item 214 (i.e., "Security-Presentation.pdf") as included in key-value pair 522, but omits other elements included in preview 224, such as images 612. Modified preview 908 also indicates that the follower may sign in to Example Service for more information.

Determining module 114 may determine whether a follower of end user 210 has permission to view preview 224 in a variety of ways. For example, as described above, metadata 220 may include a privacy mode associated with protected content item 214. If the privacy mode associated with protected content item 214 indicates that protected content item 214, and hence metadata 220 and preview 224, is available to the public (e.g., the privacy mode is "PUBLIC"), determining module 114 may determine that the follower of end user 210 has permission to view preview 224. However, if a privacy mode for protected content item 214 indicates that protected content item 214 is not available to the follower of end user 210 (e.g., the privacy mode is "PRIVATE" or "RESTRICTED"), determining module 114 may determine that the follower of end user 210 does not have permission to view preview 224.

In some examples, a privacy mode for protected content item 214 may indicate that protected content item 214, and hence preview 224, may be available to the follower of end user 210 when the follower of the end user provides valid authentication credentials (e.g., "UNKNOWN"). In such examples, one or more of modules 102 (e.g., user interface module 112, determining module 114, etc.) may attempt to obtain valid authentication credentials for protected content item 214 from the follower. For example, determining module 114 may, via user interface module 112 and a suitable follower device, present an authentication user interface to the follower of end user 210. The follower of end user 210 may then provide access credentials for protected content item 214 via the presented authentication user interface. This may be accomplished, in some examples, via an Open Authentication (OAuth) flow. If the user successfully provides valid authentication credentials, content provider system 208 may communicate to determining module 114 that the follower of end user 210 has permission to view preview 224.

In some embodiments, metadata 220 may include a list of approved users associated with protected content item 214. In such embodiments, determining module 114 may determine that the follower is in the list of approved users, and thereby determine that the follower has permission to view preview 224. By way of illustration, protected content item 214 may represent an invitation to an event. Metadata 220 associated with protected content item 214 may include a list of attendees of the event. Determining module 114 may analyze the list of attendees and determine that the follower of end user 210 is included in the list of attendees. Determining module 114 may therefore determine that, because the follower of end user 210 is in the list of attendees, the follower of end user 210 has permission to view preview 224.

As another example, in some embodiments, an administrator of content provider system 208 may provide to determining module 114 a list of approved users associated with protected content item 214 in the form of a Bloom filter. A Bloom filter is a probabilistic data structure that may be used to test whether a particular element (e.g., a follower of end user 210) is a member of a set (e.g., a list of approved users associated with protected content item 214). When a Bloom filter is queried for an element to test whether it is in the set, the query returns either (1) that the element is possibly in the set, or (2) that the element is definitely not in the set. False positives are possible, but false negatives are not. Additionally, a false positive rate of a Bloom filter may be known in advance of querying the Bloom filter, and thus the Bloom filter may be configured to have a false positive rate within a predetermined range of probability (e.g., a false positive rate of 1%) that is acceptable to all interested parties (e.g., content provider system 208, end user 210, etc.).

Therefore, determining module 114 may determine that the follower is in the list of approved users associated with protected content item 214 by querying the Bloom filter. If the query indicates that the follower may be in the list of approved users, and the Bloom filter has a false positive rate that is within a predetermined range of probability, determining module 114 may determine that the follower is in the list of approved users. If the query indicates that the follower is not in the list of approved users, determining module 114 may determine that the follower is not in the list of approved users.

Figure 10:
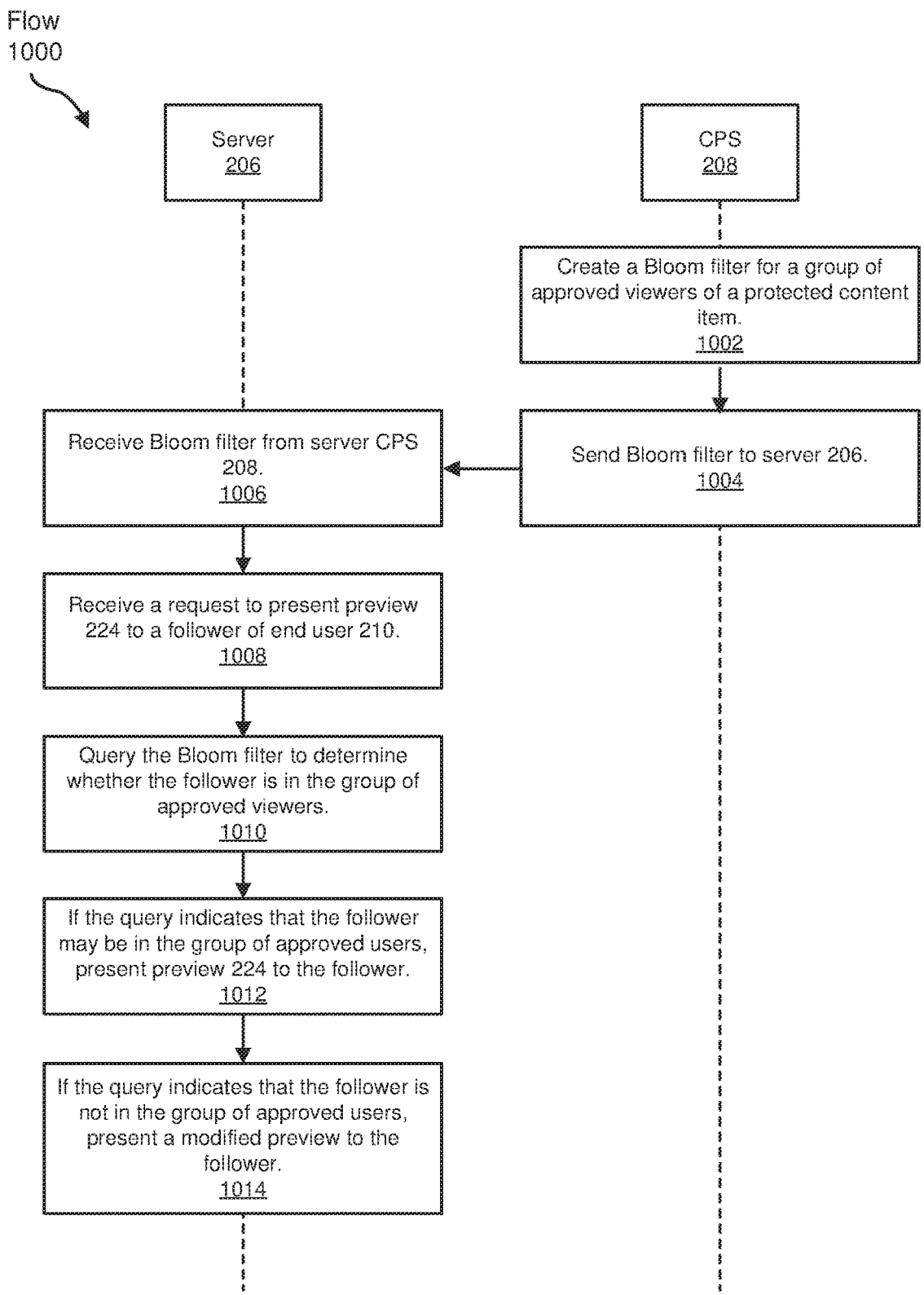
FIG. 10 illustrates an example modified preview of a protected content item that may be presented to a user who does not have permission to view a generated preview.

FIG. 10 illustrates an example operational flow 1000 for determining that a follower of an end user is in a list of approved users associated with a protected content item by using a Bloom filter that is based on the list of approved users. At step 1002, content provider system 208 ("CPS 208" in FIG. 10) creates a Bloom filter for a group of approved users of a protected content item (e.g., protected content item 214). In step 1004, content provider system 208 sends the Bloom filter to server 206. In step 1006, server 206 receives the Bloom filter from content provider system 208.

In step 1008, server 206 receives a request to present a preview of the protected content item (e.g., preview 224 of protected content item 214) to a follower of end user 210, who has previously shared preview 224 with the follower. In step 1010, server 206 (e.g., via determining module 114) queries the Bloom filter to determine whether the follower is in the group of approved viewers. In step 1012, if the query indicates that the follower may be in the group of approved users, which may also include the Bloom filter having a false positive rate within a predetermined acceptable range of probability, server 206 (e.g., via user interface module 112) may present a rich preview (e.g., preview 224) to the follower. In step 1014, if the query indicates that the follower is not in the group of approved users, server 206 may present a modified preview to the follower.

In some embodiments, one or more of modules 102 may also associate an approved user in a list of approved users with an additional user of the social networking system. This association may be based on an identifier associated with the approved user and an identifier associated with the additional user of the social networking system. Such associations may allow an approved user in the list of approved users to be correlated with a user profile within the social networking system, and may allow the systems and methods described herein to generate previews that include and/or reflect connections between shared protected content items and users of the social networking system.

An identifier associated with the approved user may be any suitable identifier. For example, the identifier associated with the approved user may be an email address, a hashed value, an app-scoped ID, a user identifier from a third-party system, and so forth. Likewise, an identifier associated with the additional user of the social networking system may also be any suitable identifier, including an email address, a user identifier within the social networking system, a hashed value, an app-scoped ID, a user identifier from a third-party system, and so forth.

Figure 11:
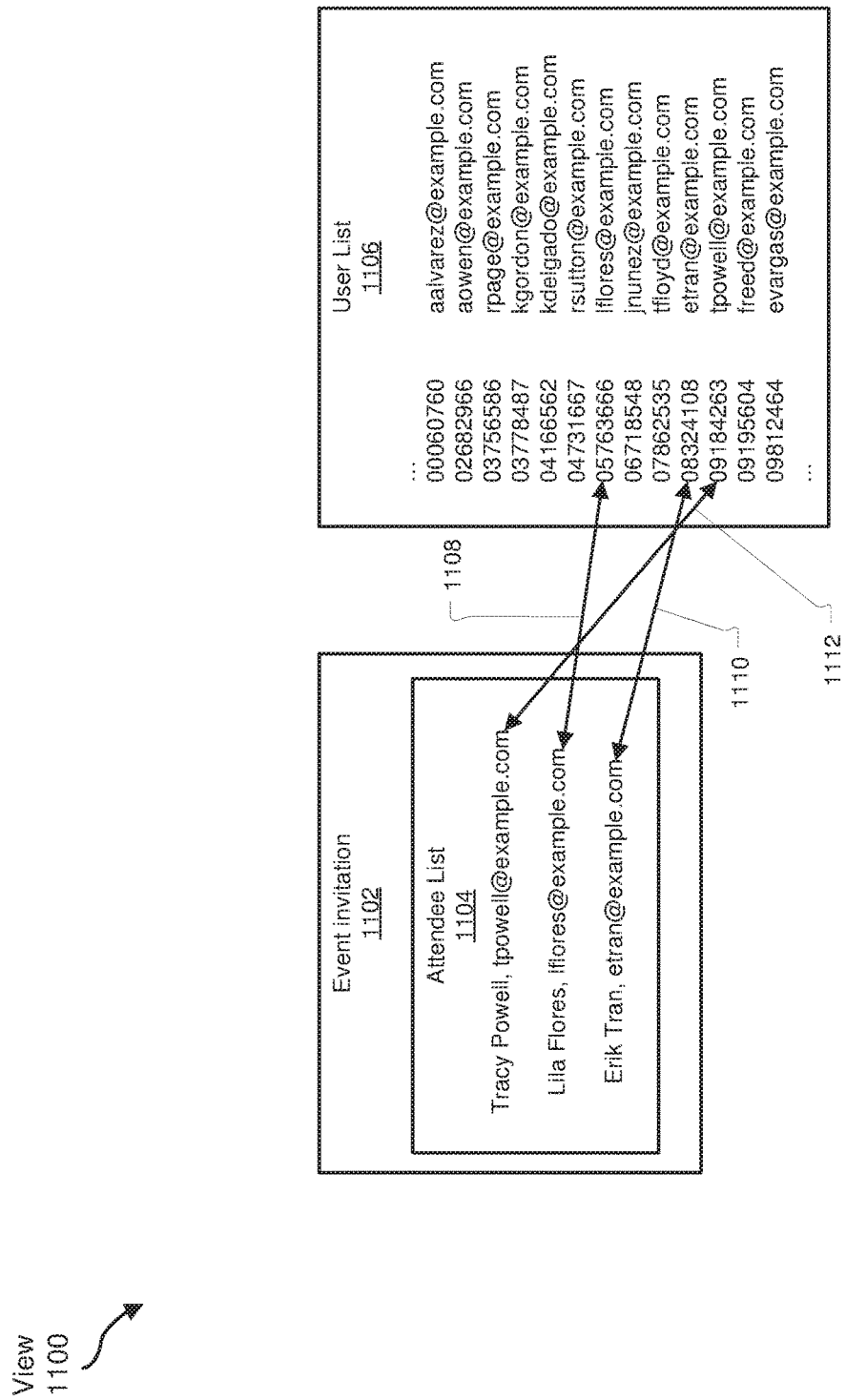
FIG. 11 is a block diagram that illustrates associating an approved user in a list of approved users with an additional user of the social networking system.

FIG. 11 illustrates associating an approved user in a list of approved users with an additional user of a social networking system. As shown, view 1100 includes event invitation 1102, which may be a protected content item. Event invitation includes attendee list 1104, which may represent a list of persons who are invited to an event associated with event invitation 1102, along with an email address corresponding to each person. If an end user (e.g., end user 210) attempts to share event invitation 1102 according to the systems and methods described herein, attendee list 1104 may be included as part of metadata 220, and may be used to generate a preview of event invitation 1102.

View 1100 also includes user list 1106, which may represent records (e.g., database entries) associated with users of a social networking system. As shown, user list 1106 includes a list of user identifiers correlated with email addresses. Each element in user list 1106 may correspond to a user of the social networking system.

One or more of modules 102 may use the information included in event invitation 1102 to associate the persons included in attendee list 1104 with users of the social networking system included in user list 1106. For example, as shown in FIG. 11, the email addresses included in attendee list 1104 may be used to associate the approved users in the attendee list with users of the social networking system. For example, arrow 1108 indicates an association between "Lila Flores, lflores@example.com" and the record "05763666 lflores@example.com." Arrow 1110 indicates an association between "Erik Tran, etran@example.com" and the record "08324108 etran@example.com." Arrow 1112 indicates an association between "Tracy Powell, tpowell@example.com" and "09184263 tpowell@example.com."

Continuing with this example, using these associations, a preview of event invitation 1102 may include not only the data included in attendee list 1104, but may also include, for example, hyperlinks to user profiles in the social networking system associated with each of the attendees in attendee list 1104. Additionally, these associations may allow the attendees of the meeting to utilize one or more features of the social networking system to manage an event associated with event invitation 1102, such as a calendaring feature, chat feature, a video conference feature, and so forth. For example, metadata associated with event invitation 1102 such as a start time and/or a duration of the associated event may be added to a calendar feature of the social networking system, and may serve to notify users of the social networking system that one or more of the attendees in attendee list 1104 may be busy during the event.

This example is merely illustrative. Associating an approved user with an additional user in a social networking system (e.g., a user profile corresponding to additional user) may allow any information in a social graph of the user maintained by the social networking system to be included in a generated preview of protected content item 214. This information may include, without limitation, information regarding friends, followers, likes, applications (e.g., games, productivity applications, etc.), and so forth.

As discussed throughout the instant disclosure, the disclosed systems and methods may provide one or more advantages over traditional preview generating systems and methods. For example, the systems and methods described herein may enable generation of previews of content items that are protected by authentication protocols. Additionally, in some embodiments of the systems and methods described herein, only a limited set of metadata regarding a protected content item is received from a content provider system (e.g., content provider system 208), which may result in significantly less data being transferred from the content provider system than by a traditional preview generating system. Additionally, users may be much more likely to share protected content via a social networking system when previews of that content are generated and presented to the users before sharing occurs. Furthermore, the systems and methods described herein may improve interoperability and information sharing between the content provider system and the social networking system. Thus, the systems and methods described herein may improve user engagement and interaction with protected content items within a social networking system by generating previews of protected content items.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive metadata associated with a content item to be transformed, transform the metadata into a preview (e.g., generate a preview from the metadata), output a result of the transformation to present the generated preview to a user of a social networking system, use the result of the transformation to present the generated preview to the user of the social networking system, and store the result of the transformation to present the preview to an additional user of the social networking system (e.g., a follower of the user). Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

The term "computer-readable medium" may, in some examples, refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, floppy disks, and so forth), optical-storage media (e.g., Compact Disks (CDs), Digital Video Disks (DVDs), BLU-RAY disks, and so forth), electronic-storage media (e.g., solid-state drives, FLASH media, and so forth), and other distribution systems.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    acquiring, from a user of a social networking system, a hyperlink to a protected content item, hosted by a content provider system, that is protected by an authentication protocol;
    sending a request for metadata associated with the protected content item to the content provider system, the request comprising authentication information associated with the authentication protocol;
    receiving, in response to the content provider system approving the request, metadata associated with the protected content item from the content provider system, the metadata comprising information sufficient to generate a preview of the protected content item; and
    generating a preview of the protected content item based on the metadata received from the content provider system.

2. The computer-implemented method of claim 1, further comprising obtaining access credentials for the protected content item from the user of the social networking system;
    wherein the request for metadata associated with the protected content item further comprises the obtained access credentials.

3. The computer-implemented method of claim 1, further comprising:
    presenting the generated preview of the protected content item to the user of the social networking system within a publishing interface of the social networking system; and
    receiving a direction from the user of the social networking system to publish the generated preview to a follower of the user in the social networking system.

4. The computer-implemented method of claim 3, further comprising:
    determining whether the follower of the user in the social networking system has permission to view the generated preview; and at least one of:
    upon determining that the follower of the user has permission to view the generated preview, presenting the generated preview to the follower of the user; or
    upon determining that the follower of the user does not have permission to view the generated preview, presenting a modified preview to the follower of the user.

5. The computer-implemented method of claim 4, wherein determining that the follower of the user has permission to view the generated preview comprises:
- receiving information representative of a list of approved users associated with the protected content item from the content provider system; and
- determining that the follower is in the list of approved users associated with the protected content item.

6. The computer-implemented method of claim 5, further comprising associating an approved user in the list of approved users with an additional user of the social networking system based on an identifier associated with the approved user and an identifier associated with the additional user of the social networking system.

7. The computer-implemented method of claim 5, wherein:
- the information representative of the list of approved users associated with the protected content item comprises a Bloom filter that is based on the list of approved users associated with the protected content item; and
- determining that the follower is in the list of approved users associated with the protected content item comprises querying the Bloom filter.

8. The computer-implemented method of claim 4, wherein determining that the follower of the user has permission to view the generated preview comprises authorizing the follower with the content provider system via an Open Authentication flow.

9. The computer-implemented method of claim 1, wherein sending the request comprises executing a hypertext transfer protocol (HTTP) GET request using the authentication information associated with the social networking system and the acquired hyperlink.

10. The computer-implemented method of claim 1, wherein sending the request comprises executing a hypertext transfer protocol (HTTP) POST request using the authentication information associated with the social networking system and an HTTP webhook callback associated with the content provider system.

11. The computer-implemented method of claim 1, wherein the received metadata associated with the protected content item further comprises at least one of:
- a portion of the protected content item;
- a title of the protected content item;
- an image associated with the protected content item;
- an Open Graph property associated with the protected content item; or
- a description of the protected content item.

12. The computer-implemented method of claim 1, wherein the received metadata associated with the protected content item comprises a privacy mode associated with the protected content item, the privacy mode comprising at least one of:
- a public mode indicating that the protected content item is publicly available;
- a restricted mode indicating that the protected content item is available to the user, but not publicly available;
- a private mode indicating that the protected content item is not available to the user; or
- an unknown mode indicating that the protected content item is available to the user only when the user provides valid authentication credentials.

13. The computer-implemented method of claim 1, wherein generating the preview of the protected content item based on the metadata received from the content provider system comprises:
- determining whether the user of the social networking system has permission to view the preview of the protected content item based on the metadata received from the content provider system;
- upon determining that the user of the social networking system has permission to view the preview of the protected content item, generating a rich preview of the protected content item; and
- upon determining that the user of the social networking system does not have permission to view the preview of the protected content item, generating a limited preview of the protected content item.

14. The computer-implemented method of claim 1, wherein the authentication information associated with the social networking system comprises at least one of:
- an identifier associated with the social networking system; or
- an identifier associated with the user of the social networking system.

15. A system comprising:
- an acquiring module, stored in memory, that acquires, from a user of a social networking system, a hyperlink to a protected content item, hosted by a content provider system, that is protected by an authentication protocol;
- a sending module, stored in memory, that sends a request for metadata associated with the protected content item to the content provider system, the request comprising authentication information associated with the authentication protocol;
- a receiving module, stored in memory, that receives, in response to the content provider system approving the request, metadata associated with the protected content item from the content provider system, the metadata comprising information sufficient to generate a preview of the protected content item;
- a generating module, stored in memory, that generates a preview of the protected content item based on the metadata received from the content provider system; and
- at least one physical processor that executes the acquiring module, the sending module, the receiving module, and the generating module.

16. The system of claim 15, further comprising a user interface module, stored in memory, that:
- presents the generated preview of the protected content item to the user of the social networking system within a publishing interface of the social networking system; and
- receives a direction from the user of the social networking system to publish the generated preview to a follower of the user in the social networking system.

17. The system of claim 16, further comprising a determining module, stored in memory, that:
- determines whether the follower of the user in the social networking system has permission to view the generated preview; and at least one of:
- upon determining that the follower of the user has permission to view the generated preview, presents the generated preview to the follower of the user; or
- upon determining that the follower of the user does not have permission to view the generated preview, presents a modified preview to the follower of the user.

18. The system of claim 15, wherein sending the request comprises executing at least one of:

a hypertext transfer protocol (HTTP) GET request using the authentication information associated with the social networking system and the acquired hyperlink; or an HTTP POST request using the authentication information associated with the social networking system and an HTTP webhook callback associated with the content provider system.

19. The system of claim 15, wherein the metadata associated with the protected content item comprises a privacy mode associated with the protected content item, the privacy mode comprising at least one of:
- a public mode indicating that the protected content item is publicly available;
- a restricted mode indicating that the protected content item is available to the user, but not publicly available;
- a private mode indicating that the protected content item is not available to the user; or
- an unknown mode indicating that the protected content item is available to the user only when the user provides valid authentication credentials.

20. A non-transitory computer-readable medium comprising instructions that, when executed by at least one processor of a computing system, cause the computing system to:
- acquire, from a user of a social networking system, a hyperlink to a protected content item, hosted by a content provider system, that is protected by an authentication protocol;
- send a request for metadata associated with the protected content item to the content provider system, the request comprising authentication information associated with the authentication protocol;
- receive, in response to the content provider system approving the request, metadata associated with the protected content item from the content provider system, the metadata comprising information sufficient to generate a preview of the protected content item; and
- generate a preview of the protected content item based on the metadata received from the content provider system.

* * * * *